(12) United States Patent
Yang

(10) Patent No.: US 7,651,780 B2
(45) Date of Patent: Jan. 26, 2010

(54) SINGLE PLY THERMOPLASTIC (TPO) ROOFING MEMBRANES HAVING SUPERIOR HEAT SEAM PEEL STRENGTHS AND LOW TEMPERATURE FLEXIBILITY

(75) Inventor: Li-Ying Yang, Whippany, NJ (US)

(73) Assignee: Building Materials Investments Corporation, Wilmington, DE (US)

( * ) Notice: Subject to any disclaimer, the term of this patent is extended or adjusted under 35 U.S.C. 154(b) by 0 days.

(21) Appl. No.: 10/565,465

(22) PCT Filed: Jun. 29, 2004

(86) PCT No.: PCT/US2004/021053

§ 371 (c)(1), (2), (4) Date: Jun. 19, 2006

(87) PCT Pub. No.: WO2005/014281

PCT Pub. Date: Feb. 17, 2005

(65) Prior Publication Data

US 2007/0111018 A1   May 17, 2007

(51) Int. Cl.
*B32B 27/08* (2006.01)

(52) U.S. Cl. .................... 428/515
(58) Field of Classification Search .............. None
See application file for complete search history.

(56) References Cited

U.S. PATENT DOCUMENTS 5,256,228 A * 10/1993 Davis et al. .............. 156/157
6,544,909 B1 * 4/2003 Venkataswamy et al. ..... 442/38
6,743,864 B2 * 6/2004 Glogovsky et al. .......... 525/191

FOREIGN PATENT DOCUMENTS

WO    WO 0196110    12/2001

OTHER PUBLICATIONS

Statutory Invention Registration No. US H2000 H, Middleworth et al.; Publication Date: Nov. 6, 2001.

* cited by examiner

*Primary Examiner*—Sheeba Ahmed
(74) *Attorney, Agent, or Firm*—William J. Davis; Sills Cummis & Gross

(57) ABSTRACT

Roofing membranes of single ply heat seamable thermoplastic polyolefin (TPO) sheets are made with a metallocene-catalyzed polyethylene (MPO) blend. The membranes exhibit superior heat seam peel strengths and low temperature flexibility.

4 Claims, No Drawings

SINGLE PLY THERMOPLASTIC (TPO) ROOFING MEMBRANES HAVING SUPERIOR HEAT SEAM PEEL STRENGTHS AND LOW TEMPERATURE FLEXIBILITY

FIELD OF THE INVENTION

This invention relates to single ply reinforced roofing membranes made of metallocence-catalyzed thermoplastic polyolefin (TPO) sheets which cover industrial and commercial flat roofs, and, more particularly to such membranes which exhibit advantageously superior heat peel strengths and ultra low temperature flexibility.

BACKGROUND OF THE INVENTION

Polymeric roof sheeting is used as single ply roofing membrane for covering industrial and commercial flat roofs. Such membranes are generally applied to the roof surface in vulcanized or cured state. Because of outstanding weathering resistance and flexibility, cured EPDM based roof sheeting has been rapidly gaining acceptance. However, a disadvantage of cured rubber roofing is that it requires the use of adhesive for joining and sealing the edges of membranes due to the lack of adhesion of rubber to itself.

Over the years, Thermoplastic Polyolefin (TPO) has been widely used as heat seamable roof sheeting material. It eliminates the use of adhesive to provide an acceptable seam. However, conventional polypropylene based TPO roofing sheets are rather stiff, i.e. not flexible, which is disadvantageous for installation of such membranes in extreme cold weather.

Polyethylene having lower glass transition temperature than polypropylene provides enhanced flexibility, particularly in low temperature would be desirable roofing material to meet cold temperature installation requirement.

One critical requirement to be taken into account when selecting a heat seamable TPO resin is its long-term heat seam peel strength. A conventional Ziegler-Natta catalyzed polyolefin have a bimodal or broad molecular weight distribution. The low molecular weight oligomers extract out of polymer over time. The high extractables of Z-N catalyzed polyolefins are undesirable for heat seamable roofing materials because they bloom to the surface of the sheet and deteriorates the heat seam strength.

Accordingly, it is an object of the present invention to provide a new and improved single ply heat seamable TPO roofing sheets having advantageous low temperature flexibility and heat seam peel strengths.

Another object herein is to provide such roofing sheets in which its membranes have a 90° peel strength of ≧60 lbs/linear inch (ASTM D-413), and a cold brittleness point of ≦−50° C. (ASTM D-2137), over an extended period of use, and under a wide range of temperature conditions.

These and other objects and features herein will be made apparent from the following description of the invention.

SUMMARY OF THE INVENTION

What is described herein is a roofing membrane which includes a plurality of single ply thermoplastic polyolefin (TPO) roofing sheets. The membrane comprises a reinforcement scrim sandwiched between cap and base layers, i.e. the TPO sheets, which are pressed together into a single ply membrane with a thickness of about 35-90 mils, characterized in that both of said layers are made of metallocene-catalyzed polyolefin (MPO), preferably polyethylene, and comonomers with butene, hexane or octene, with a narrow molecular weight distribution of about 2 to 2.5, and a minimum of low molecular weight oligomers, the membranes exhibiting a 90° heat seam peel strength of ≧60 lbs/linear inch (ASTM D-413), and a cold brittleness point of ≦−50° C., (ASTM D-2137), over an extended period of time of use, and under a wide range of temperature conditions.

DETAILED DESCRIPTION OF THE INVENTION

The membranes of the present invention are made of metallocene-catalyzed polyolefin materials. These metallocene polyolefin roofing membranes generally comprise 100 parts by weight of ethylene homopolymers (MPE), or copolymers of ethylene with higher alpha-olefin comonomers, and mixtures thereof; 0 to 55 parts by weight of crystallinity enhancing polymers, 0-50 parts by weight of ethylene-propylene rubber (EPR), 0 to 80 parts of fire retardant. Other additive ingredients include zinc oxide, antoxidants, and UV stabilizers, carbon black, titanium dioxide and fillers.

The MPE polymers of the invention comprise ethylene and/or a copolymer of ethylene with at least one $C_3$ to $C_{20}$ alpha-alkene. Suitable comonomers include 1-propene, isobutylene, 1-butene, 1-hexene, 4-methyl-pentene, 1-octene, styrene, and halo- or alkyl substituted styrenes. Generally the metallocence polyethylene polymer has (a) a density of about 0.85 g/cm$^3$ to about 0.98 g/cm$^3$; preferably from about 0.86 to 0.92 g/cm$^3$; and (b) a melt index, $I_2$, of about 0.01 to about 1000 g/10 min., preferably from about 0.1 to 100 g/10 min., and, most preferably, 0.5 to 10 g/10 min., $I_2$ measured in accordance with ASTM D-1238 (190° C./2.16 kg).

Metallocene polyolefins are classified in the art as single site catalyst-based polyolefin resins. Such single site catalyst-based polyethylene materials are produced by polymerization of ethylene monomers in the presence of a single sited catalyst which restricts the progress of the polymerization. These metallocene-catalyzed polymers have a relatively narrow molecular weight distribution (MWD) and only a small amount of long chain branched polymers, or low molecular weight oligomers. Preferably, the MWD of metallocene polyolefins, e.g. metallocene polyethylene (MPE) is 2-2.5, indicating a very high degree of molecular uniformity. In contrast, polymerization using Ziegler-Natta (Z-N) catalysts typically produce polymers having a much broader MWD, of about 4-8. Such Z-N polymer compositions vary not only from one molecule to another, but also between molecules of different MW. It is extremely difficult to achieve a MWD less than 3 in Z-N polymers, and virtually impossible to make high MW copolymers with a uniform, acceptable compositional distribution. A Z-N catalyzed polymerization results in its high MW fraction having too little comonomer and its low fraction too much comonomer, leading to high extractables. The high extractables of Z-N catalyzed polyolefins are undesirable for heat seamable roofing sheets because they bloom to the surface of the sheet which deteriorates the heat seamability between membranes.

Examples of invention MPE polymers are copolymers of ethylene with butene, hexene or octene, such as EXACT®, made by Exxon-Mobil Chemical, having a density of 0.88-0.91 g/cm$^3$, and Engage®, made by duPont Dow Elastomers, having a melt index of 0.5-5. A preferred MPE is a copolymer of ethylene and butene with about 75-85% ethylene with the balance to total 100 wt. % being butene.

Crystallinity enhancing polymers are present in the polymer composition of the present invention and are suitably polyolefin homopolymers, random copolymers or block copolymers. Homopolymers include polyethylene and polypropylene. Random copolymers include poly(propylene-co-butene) copolymers. Block copolymers include poly(propylene-b-ethylene) copolymers. The presence of a crystallinity enhancing polymer provides tensile strength and heat resistance of the roofing sheets. Preferred crystallinity enhancing polymers include HDPE 8920 and PP 189 from Union Carbide, HDPE 8920 has a crystallinity of 67 wt. % and a melt index of 18 to 22. The PP 189 has a crystallinity of 50 wt. % and a melt index of 4.9 to 6.5.

The preferred EPR are copolymers of ethylene and propylene having about 50% to 80% ethylene and up to 5 wt. % of diene with the balance of the polymer being propylene. Particularly useful and preferred EPR materials include Vistalona® MDV 91-9 from Exxon Mobil Chemical Co., JSR® EP02P from JSR Corporation, and Buna® EPT2070P from Bayer Co. Vistalona® MDV 91-9 has a Mooney viscosity (ML 1+4 at 125° C.) of 15-21, 58-60 wt. % of ethylene, and 0% of unsaturation (ethylidene norbornene). JSR® EP02P has a Mooney viscosity (ML1+4 at 100° C.) of 22-28, 68-74 wt. % of ethylene, and 0% of unsaturation (ethylidene norbornene). Buna® EPT2070P has a Mooney viscosity (ML1+8 at 100° C.) of 30-42, 65-71 wt. % of ethylene, and 0% of unsaturation (ethylidene norbornene).

Suitable fire retardant in roofing sheets includes magnesium hydroxide, magnesium oxide, hydrated magnesium carbonate, alumina trihydrates, antimony oxide, clay, silica, perlite, vermiculite, and borate.

Fillers present in the composition of the invention are usually reinforcing and non-reinforcing materials, and mixtures thereof. Suitable fillers include carbon black, ground coal, calcium carbonate, dolomite, talc, clay, silica and mica.

The invention will now be described in more detail with reference to the following examples.

STANDARD EXAMPLE

Cap (top) and base (bottom) sheets (layers) of a standard single ply reinforcement polyolefin roofing membrane was made of 100 parts of polyolefin resins (Z-N catalyzed LLDPE) and conventional ingredients, such as 0-80 parts of fire retardant, 0-55 parts of crystallinity enhancing polymers, 0-50 parts by weight of ethylene-propylene rubber (EPR), zinc oxide, UV and thermal stabilizers, carbon black, titanium dioxide and calcium carbonate, as is well known in the art. The ingredients were mixed in a extruder at 200° C. and sheeted to a thickness of about 20-50 mils. A reinforcement scrim then was inserted between the top and bottom sheets, and the three layers were pressed into a 40-90 mil reinforced single ply membrane.

INVENTION EXAMPLE

The following example represents heat seamable polyester reinforced TPO membrane compositions in which the base and cap layers include a metallocene catalyzed polyethylene, e.g. EXACT® 3128 and 3022, and all other conventional ingredients described in the Standard Example.

The ingredients were compounded in an extruder at 180° C. and sheeted to a thickness ranging from 20-30 mils. Then a reinforcement scrim was inserted between the base and cap layers and the three layers were pressed into a 40-90-mil single ply reinforced membrane.

The fresh standard and invention membranes were then heat welded with an automatic welder and tested for heat seam peel strength i.e. ply adhesion, in the 90° direction.

The standard and invention membranes were also heat aged at dry oven at 158° F. for 1 and 4 days to simulate aged membranes on the roof. The heat seam peel strength of fresh and aged TPO membranes were shown in Table 1.

TABLE 1

Heat Seam Peel Strength* of 45-mil Reinforced TPO Membranes

| Heat Seam Peel Strength (PLI) | Days Heat Aged 0 | Days Heat Aged 1 | Days Heat Aged 4 |
|---|---|---|---|
| TPO made with Z-N LLDPE | 35(±3) | 10(±7) | 2(±1) |
| TPO made with MPE | 66(±4) | 69(±6) | 67(±5) |

*90° Peel Strength, lbs/linear inch (PLI) (ASTM D-413)

The results in Table 1 indicates that the membranes of the invention have a 90° peel strength of ≧60 lbs/linear inch, even after 4 days of aging, and, experimentally, between 66-69 lbs/linear inch, whereas the Z-N polymers have only half these values, and they deteriorate rapidly after 1 or 4 days.

TABLE 2

Cold Brittleness Point of Heat Seamable TPO Membranes

| | Cold Brittleness Point, ° C. (ASTM D-2137) |
|---|---|
| PE-Based TPO1 (Table 1) | −70 |
| PE-Based TPO2 (Table 1) | −58 |
| PP-Based TPO1 (Commercial) | −43 |
| PP-Based TPO2 (Commercial) | −33 |

The data in Table 2 indicates that the membranes of PE-based TPO have a brittleness point of ≦50° C., and, experimentally, from −58 to −70° C., whereas conventional PP-based TPO reinforced roofing membranes, are less flexible, i.e. at least 15° to 37° C. higher than the PE membranes.

While the invention has been described with particular reference to certain embodiments thereof, it will be understood that changes and modifications may be made which are within the skill of the art. Accordingly, it is intended to be bound only by the following claims, in which:

What is claimed is:

1. A thermoplastic polyolefin (TPO) roofing membrane comprising a reinforcement scrim sandwiched between cap and base layers which are pressed into a single ply membrane having a thickness of about 35-90 mils, characterized in that both of said layers are made of, by weight, 50-90% of metallocene-catalyzed polyethylene and about 10-50% of additives including a crystallinity enhancing polymer comprising high density polyethylene (HDPE), said membrane exhibiting a 90° heat seam peel strength of ≧60 lbs/linear inch (ASTM D-413) and a cold brittleness point of ≦50 °C. (ASTM D-413).

2. A roofing membrane according to claim 1 wherein said 90° heat seam peel strength is about 66-69 lbs/linear inch over a 4 day period, and said cold brittleness point is about −58 to −70° C.

3. A roofing membrane according to claim 1 wherein the molecular weight distribution (MWD) of said polyolefin is about 2 to 2.5.

4. A thermoplastic polyolefin (TPO) roofing membrane comprising a reinforcement scrim sandwiched between cap and base layers which are pressed into a single ply membrane having a thickness of about 40-90 mils, wherein both of said cap and base layers are produced by a process comprising combining, by weight:
(a) 50-90% of the polymeric components of the cap and base layers of metallocene-catalyzed polyethylene;
(b) an ethylene-propylene rubber (EPR); and
(c) a crystallinity enhancing polymer comprising one of the following:
   (i) high density polyethylene (HDPE) having a crystallinity of 67 wt. %; and
   (ii) polypropylene (PP) having a crystallinity of 50 wt. %.

* * * * *